March 31, 1936.  M. R. MILLER  2,035,613
VOLTAGE CONTROL SYSTEM
Filed Nov. 14, 1934
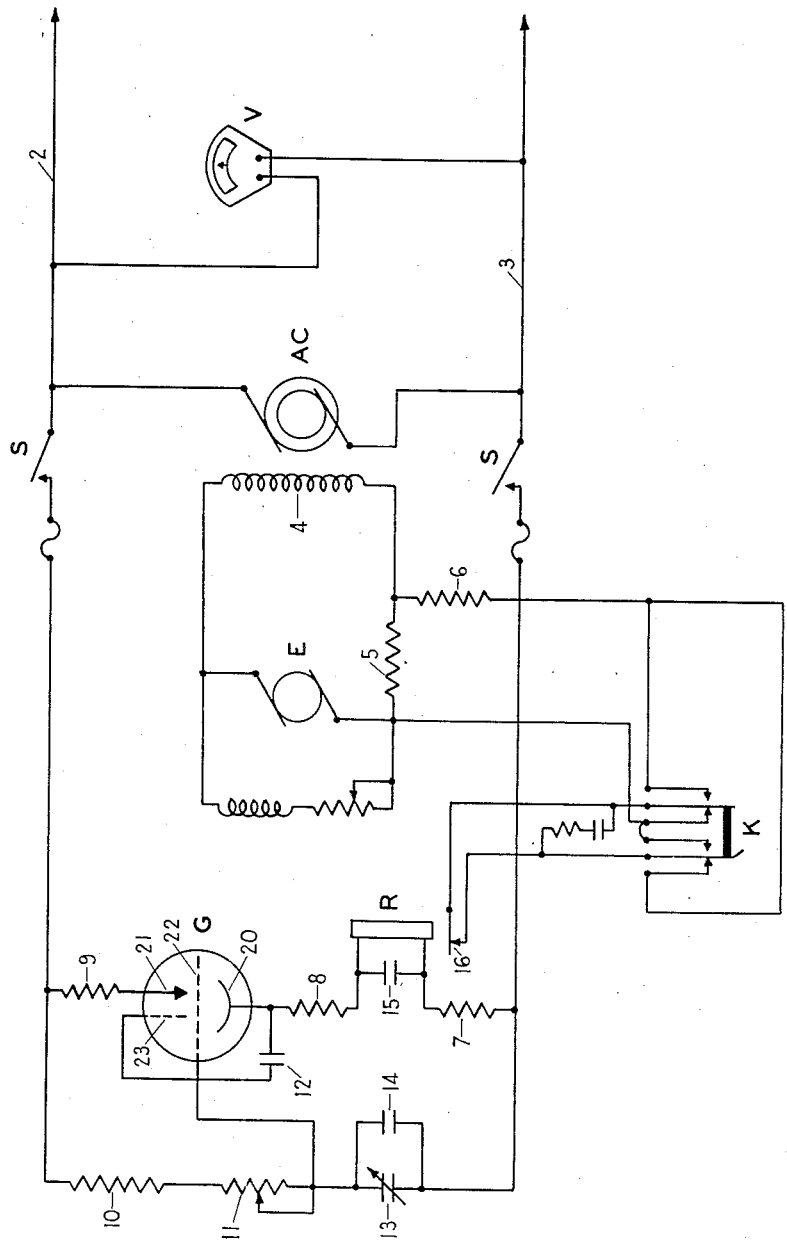
INVENTOR.
MERTON R. MILLER
BY
*R. G. Richardson*
ATTORNEY.

Patented Mar. 31, 1936

2,035,613

UNITED STATES PATENT OFFICE 2,035,613

VOLTAGE CONTROL SYSTEM

Merton R. Miller, Evanston, Ill., assignor, by mesne assignments, to Associated Electric Laboratories, Inc., Chicago, Ill., a corporation of Delaware Application November 14, 1934, Serial No. 752,980

4 Claims. (Cl. 171—119)

The present invention relates in general to voltage control systems, and more in particular to systems of this character which are adapted for use in controlling the output voltage of an A. C. generator. The object may be stated to be the production of an improved and highly efficient voltage control system which will maintain the output voltage of a generator within close limits notwithstanding unusually large changes in the load.

The invention will be described more in detail hereinafter, reference being made to the accompanying drawing, which is a circuit diagram, showing how the invention may be used in practice.

Referring to the drawing, the reference letters AC indicate an alternating current generator which is adapted to supply current to the mains or bus-bars comprising conductors 2 and 3. The field winding of the generator is indicated at 4. An exciter E may be provided to furnish direct current for energizing the field winding 4. It may be noted that this circuit includes the resistance 5. There may be a voltmeter V bridged across the mains 2 and 3.

The reference letter G indicates a so-called grid glow tube, which may be of the cold cathode gas filled type as manufactured by the Westinghouse Electric & Manufacturing Co. This tube comprises a cathode 20, an anode 21, a grid 22, and a shield 23. These elements are all enclosed in a sealed glass receptacle of the well known form, which is filled with neon gas at a pressure of about one one-hundredth of an atmosphere. The anode and cathode are connected across the mains, assuming that the switch S is closed, in series with a relay R. The circuit also includes resistances 7, 8, and 9, as shown in the drawing. There may be a condenser 15 bridged around relay R. The shield 23 may be connected to the cathode 20 through a condenser 12.

The grid 22 of the glow tube is connected to a phase shifting circuit comprising resistance 10, a variable resistance 11, condenser 14, and variable condenser 13.

The relay R has a pair of normally closed contacts 16. Through these contacts the resistance 6 is shunted around the resistance 5. The connecting leads to contacts 16 pass through a reversing key K.

Assuming now that the generator AC is running, delivering current to the mains 2 and 3, the glow tube G will flash over once during each cycle during that portion of the cycle in which the main 2 is positive with respect to the main 3. When the tube flashes over or becomes conductive the relay R operates and this relay therefore will continuously vibrate its armature at the same frequency as the frequency of the generator. In the operated condition of the relay contacts 16 are open, and resistance 6 is disconnected from in shunt of resistance 5. The effect of opening contacts 16 is therefore to reduce the current in the field of the generator. Closing the contacts 16 increases the current. Because of the large amount of iron in the field, the fluctuations are smoothed out and the field strength may be regarded as having a substantially steady value as determined by the average current in the field winding 4.

If the voltage should start to rise, the glow tube G at once notices the change and begins to flash over a little earlier in each cycle. The tube is extinguished at the same point each time, and consequently the effect of the earlier flash over is to produce longer energizations of the relay R and longer openings of contacts 16. The average field current is therefore reduced, which tends to reduce the voltage, counteracting the cause, such as reduction in load, which produced the voltage rise.

If, on the other hand, the voltage should begin to fall, due to an increased load, the glow lamp will flash over later in each cycle and the energizations of relay R will become shorter. This increases the average field current and tends to raise the voltage.

The value at which the voltage is maintained is adjusted or regulated by adjusting the phase shifting circuit including the variable resistance 11 and the variable condenser 13. The adjustment of the phase shifting circuit changes the phase relation between the grid voltage and the voltage across the mains, and thus changes the operation of the glow tube G, causing it to flash over on lower or higher anode potentials as desired.

The purpose of the reversing key K is to prevent the transfer of metal between the contacts 16. These contacts may be protected by a condenser, as shown in the drawing, which reduces the sparking to a small amount; but the reversing key is desirable nevertheless to insure a constant adjustment and long life of the contacts. The key is periodically operated and released at convenient intervals, say once every day.

While I have shown and described one particular embodiment of the invention, it will be understood that modifications may be made without departing from the principles involved, and I do not therefore wish to be limited to the precise form of the invention which is shown, but desire to include and have protected by Letters Patent all forms and modifications thereof which come within the scope of the appended claims.

What is claimed is:

1. In a voltage control system, an alternating current generator, a glow tube bridged across the output circuit of said generator, and means including a relay in series with said tube for varying the field strength of said generator.

2. In a voltage control system, an alternating current generator, a relay for producing a change in the field strength of said alternator, and means including a glow tube for operating said relay at the generator frequency.

3. In a voltage control system, an alternating current generator, a relay for producing a change in the field strength of said generator, a circuit over which said relay is bridged across the output leads of the generator, whereby the relay is operated at the generator frequency, and means including a glow tube included in said circuit for determining the point in each cycle at which the relay is operated.

4. In a voltage control system, the combination, with an alternating current generator, of means for always changing the value of the field current by a fixed amount at some point in each cycle, the current being always restored to normal value at the same point in each cycle, and means controlled by voltage fluctuations for determining the point in each cycle at which the current change takes place.

MERTON R. MILLER.